US012423945B2

(12) United States Patent
Tinklenberg et al.

(10) Patent No.: US 12,423,945 B2
(45) Date of Patent: Sep. 23, 2025

(54) SYSTEMS AND ASSOCIATED METHODS FOR ALIGNING OUTPUTS OF DIFFERENT ARTIFICIAL INTELLIGENCE (AI) MODELS

(71) Applicants: Sony Interactive Entertainment LLC, San Mateo, CA (US); Sony Interactive Entertainment Inc., Tokyo (JP)

(72) Inventors: Bethany Tinklenberg, San Mateo, CA (US); Tatianna Forget, San Mateo, CA (US); Mahdi Azmandian, San Mateo, CA (US)

(73) Assignees: Sony Interactive Entertainment LLC, San Mateo, CA (US); Sony Interactive Entertainment Inc., Tokyo (JP)

( * ) Notice: Subject to any disclaimer, the term of this patent is extended or adjusted under 35 U.S.C. 154(b) by 65 days.

(21) Appl. No.: 18/582,567

(22) Filed: Feb. 20, 2024

(65) Prior Publication Data
US 2025/0265809 A1  Aug. 21, 2025

(51) Int. Cl.
*G06V 10/75* (2022.01)
*G06V 10/74* (2022.01)

(52) U.S. Cl.
CPC .......... *G06V 10/751* (2022.01); *G06V 10/761* (2022.01)

(58) Field of Classification Search
None
See application file for complete search history.

(56) References Cited

U.S. PATENT DOCUMENTS 11,372,914 B2 *   6/2022  Kumar ................. G06F 16/538
12,197,496 B1 *   1/2025  Chakrabarty ......... G06F 16/538
2017/0294000 A1 * 10/2017  Shen ................... G06F 3/0482
(Continued)

FOREIGN PATENT DOCUMENTS

CN        117131271 A  * 11/2023  ......... G06F 16/9535

OTHER PUBLICATIONS

Mahajan, S., Rahman, T., Yi, K. M., & Sigal, L. (2024). Prompting hard or hardly prompting: Prompt inversion for text-to-image diffusion models. In Proceedings of the IEEE/CVF Conference on Computer Vision and Pattern Recognition (pp. 6808-6817). (Year: 2024).*

(Continued)

*Primary Examiner* — Ian L Lemieux
(74) *Attorney, Agent, or Firm* — Fish & Richardson P.C.

(57) ABSTRACT

A first AI-based image generation system generates a reference image based on a reference input specification that is initially set equal to an initial input for AI-based image generation. A second AI-based image generation system generates a trial image based on a trial input specification that is initially set equal to the initial input for AI-based image generation. An image matching assessment system processes the trial image and the reference image through an image analysis AI model to determine an amount of similarity therebetween and generate a corresponding image match score. A trial input specification adjustment engine generates a revised version of the trial input specification for the second AI-based image generation system to generate a new trial image that improves the image match score. In this manner, trial images are iteratively generated until the image match score is equal to or greater than the minimum required image match score.

20 Claims, 8 Drawing Sheets

(56) References Cited

U.S. PATENT DOCUMENTS

| | | | |
|---|---|---|---|
| 2023/0377099 | A1 | 11/2023 | Kreis et al. |
| 2023/0377226 | A1* | 11/2023 | Saharia ................. G06V 10/82 |
| 2024/0005604 | A1 | 1/2024 | Kreis et al. |
| 2024/0037822 | A1* | 2/2024 | Aberman ............ G06F 3/04845 |
| 2024/0185588 | A1* | 6/2024 | Kumari ................. G06V 10/778 |
| 2024/0221235 | A1* | 7/2024 | Gafni ........................ G06T 9/00 |
| 2024/0370660 | A1* | 11/2024 | Cha ......................... G06T 11/00 |
| 2025/0005901 | A1* | 1/2025 | Cha ......................... G06V 10/74 |
| 2025/0005918 | A1* | 1/2025 | Willmott ................ G06V 10/86 |
| 2025/0077765 | A1* | 3/2025 | Xu .......................... G06F 40/56 |
| 2025/0111202 | A1* | 4/2025 | Ghaeini ............... G06N 3/0455 |
| 2025/0182404 | A1* | 6/2025 | Kreis ...................... G06T 13/20 |

OTHER PUBLICATIONS

Fan, Z., Li, X., Nag, K., Fang, C., Biswas, T., Xu, J., & Achan, K. (May 2024). Prompt optimizer of text-to-image diffusion models for abstract concept understanding. In Companion Proceedings of the ACM Web Conference 2024 (pp. 1530-1537). (Year: 2024).*

Wang, R., Liu, T., Hsieh, C. J., & Gong, B. (2024). On discrete prompt optimization for diffusion models. arXiv preprint arXiv:2407. 01606. (Year: 2024).*

Li, W., Wang, J., & Zhang, X. (Nov. 2024). PROMPTIST: Automated Prompt Optimization for Text-to-Image Synthesis. In CCF International Conference on Natural Language Processing and Chinese Computing (pp. 295-306). Singapore: Springer Nature Singapore. (Year: 2024).*

Jiang, D., Song, G., Wu, X., Zhang, R., Shen, D., Zong, Z., . . . & Li, H. (2024). Comat: Aligning text-to-image diffusion model with image-to-text concept matching. Advances in Neural Information Processing Systems, 37, 76177-76209. (Year: 2024).*

Meng, C., Ma, F., Miao, J., Zhang, C., Yang, Y., & Zhuang, Y. (Apr. 2025). Image Regeneration: Evaluating Text-to-Image Model via Generating Identical Image with Multimodal Large Language Models. In Proceedings of the AAAI Conference on Artificial Intelligence (vol. 39, No. 6, pp. 6090-6098). (Year: 2025).*

Kirstain, Y., Polyak, A., Singer, U., Matiana, S., Penna, J., & Levy, O. (2023). Pick-a-pic: An open dataset of user preferences for text-to-image generation. Advances in Neural Information Processing Systems, 36, 36652-36663. (Year: 2023).*

International Search Report and Written Opinion in International Appln. No. PCT/US2025/016288, mailed on May 5, 2025, 8 pages.

* cited by examiner

SYSTEMS AND ASSOCIATED METHODS FOR ALIGNING OUTPUTS OF DIFFERENT ARTIFICIAL INTELLIGENCE (AI) MODELS

BACKGROUND OF THE INVENTION

The video game industry has seen many changes over the years and has been trying to find ways to enhance the video game play experience for players and increase player engagement with the video games and/or online gaming systems, which ultimately leads to increased revenue for the video game developers and providers and the video game industry in general. Artificial intelligence (AI) is being utilized more in the development of video game content. It is within this context that implementations of the present disclosure arise.

SUMMARY OF THE INVENTION

In an example embodiment, a system is disclosed for aligning outputs of different AI-based image generation systems. The system includes an input processor configured to receive an initial input for AI-based image generation. The input processor is configured to receive a specification of a minimum required image match score. The system also includes a first AI-based image generation system configured to generate a reference image based on a reference input specification. The reference input specification is initially set equal to the initial input for AI-based image generation. The system also includes a second AI-based image generation system configured to generate a trial image based on a trial input specification. The trial input specification is also initially set equal to the initial input for AI-based image generation. The second AI-based image generation system is different than the first AI-based image generation system. The system also includes an image matching assessment system configured to process the trial image and the reference image through an image analysis AI model to determine an amount of similarity between the trial image and the reference image. The image matching assessment system is configured to generate an image match score based on the determined amount of similarity between the trial image and the reference image. The system also includes a trial input specification adjustment engine configured to generate a revised version of the trial input specification for use in generation of a new version of the trial image by the second AI-based image generation system that provides for an increase of the image match score. The system also includes a controller configured to direct iterative operation of the second AI-based image generation system, the image matching assessment system, and the trial input specification adjustment engine until the image match score is equal to or greater than the minimum required image match score. The system also includes an output processor configured to format and convey as output each of the reference input specification, the reference image, the trial input specification, the trial image, and the image match score when the image match score is equal to or greater than the minimum required image match score.

In an example embodiment, a method is disclosed for aligning outputs of different AI-based image generation systems. The method includes an operation a) for receiving an initial input for AI-based image generation. The method also includes an operation b) for receiving a specification of a minimum required image match score. The method also includes an operation c) for operating a first AI-based image generation system to generate a reference image based on a reference input specification. The reference input specification is initially set equal to the initial input for AI-based image generation. The method also includes an operation d) for operating a second AI-based image generation system to generate a trial image based on a trial input specification. The trial input specification is also initially set equal to the initial input for AI-based image generation. The second AI-based image generation system is different than the first AI-based image generation system. The method also includes an operation e) for processing the trial image and the reference image through an image analysis AI model to determine an amount of similarity between the trial image and the reference image. The method also includes an operation f) for generating an image match score for the trial image based on the amount of similarity between the trial image and the reference image as determined in operation e). The method also includes an operation g) in which, if the image match score is less than the minimum required image match score, then a trial input specification adjustment engine is operated to generate a revised version of the trial input specification for use in generation of a new version of the trial image by the second AI-based image generation system that provides for an increase of the image match score, followed by sequentially repeating operations d), e), f), and g). Also, in the operation g), if the image match score is greater than or equal to the minimum required image match score, then the method proceeds with an operation h) for formatting and conveying as output each of the reference input specification, the reference image, the trial input specification, the trial image, and the image match score.

DETAILED DESCRIPTION OF THE INVENTION

Figure 1:
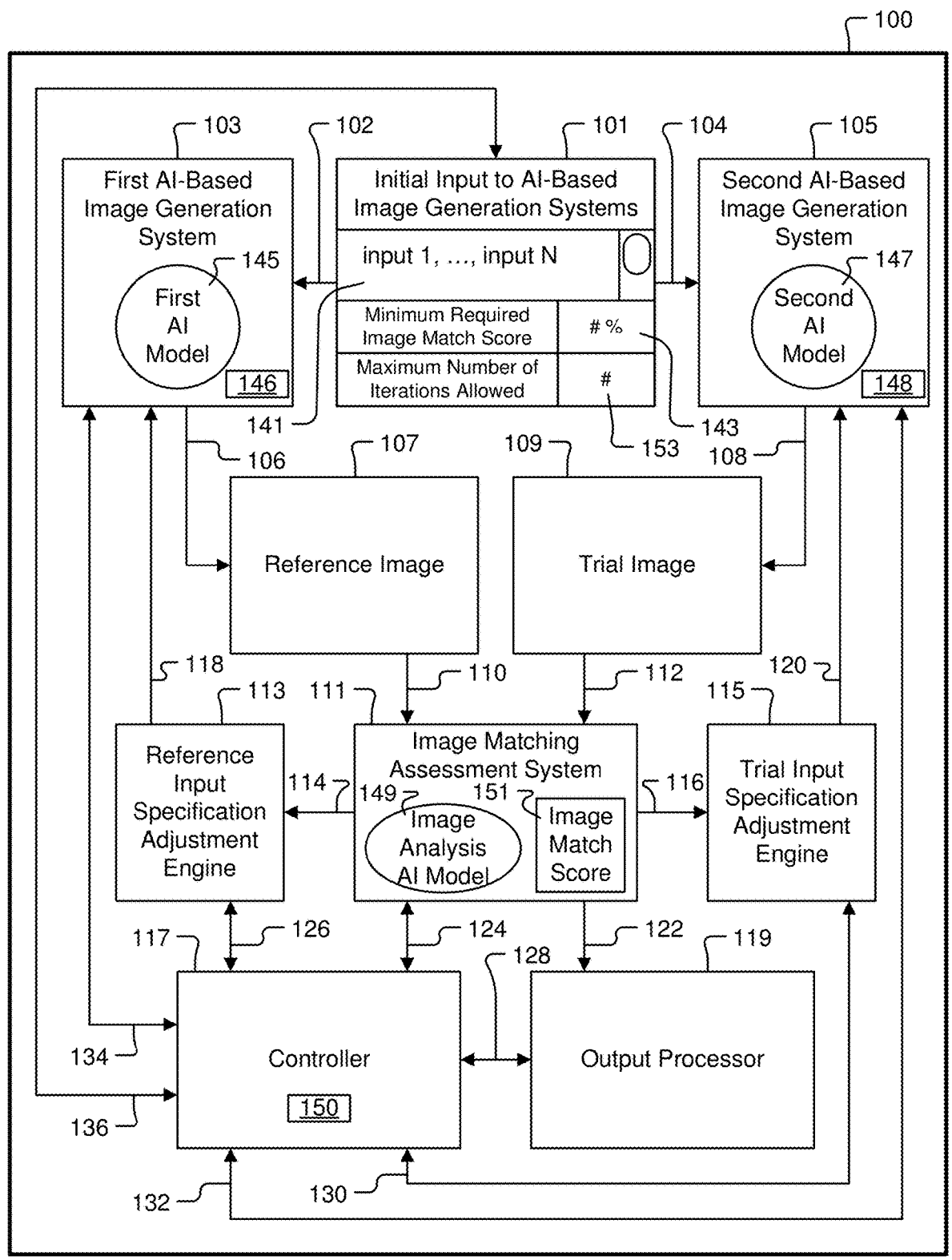
FIG. 1 shows a system for aligning graphical image outputs of different AI-based image generation systems, in accordance with some embodiments.

In the following description, numerous specific details are set forth in order to provide a thorough understanding of the present disclosure. It will be apparent, however, to one skilled in the art that embodiments of the present disclosure may be practiced without some or all of these specific details. In other instances, well known process operations have not been described in detail in order not to unnecessarily obscure the present disclosure.

Many modern computer applications, such as video games, virtual reality applications, augmented reality applications, virtual world applications, etc., include many images of many different virtual objects (or virtual assets). For ease of description, the term "computer application" as used herein refers to any type of computer application in which images of virtual objects (or virtual assets) are displayed. For ease of description, the term "designer" as used herein refers to a real-world person that engages in the activity of creating images for virtual objects for use in computer applications. Also, for ease of description, the term "user" as used herein refers to a real-world person that utilizes the systems and methods disclosed herein for generating images of virtual objects. In some embodiments, a user is a designer of a images for use in computer applications.

Images of virtual objects and/or scenes are created by designers to fit the context of the computer application in which they will be displayed. The virtual objects can be essentially any noun, e.g., any person, place, or thing. The virtual scenes can include any number, shape, size, orientation, color, texture, and arrangement of virtual objects. It should be appreciated that there is an essentially limitless number of ways in which any given virtual object and virtual scene can be imagined, designed, specified, and imaged by a designer. For example, consider a particular context of a particular computer application that calls for display of a tree as a virtual object in a park. In designing the virtual object for the tree, the designer is tasked with specifying many attributes of the tree, such as the height, the trunk shape, the trunk size, the canopy shape, the canopy size, the shapes of branches, the type of foliage, the type of bark, the color(s) of the bark, the color(s) of the branches, the color(s) of the foliage, the density of the foliage, the presence of fruit/berries/flowers/nuts/cones, the types of fruit/berries/flowers/nuts/cones, the shapes of the fruit/berries/flowers/nuts/cones, the sizes of the fruit/berries/flowers/nuts/cones, the colors of the fruit/berries/flowers/nuts/cones, the distribution of the fruit/berries/flowers/nuts/cones within the foliage, among other attributes. Moreover, the various options for the park scenery in which the tree exists is essentially limitless. It should be appreciated that for many virtual objects/scenes, there are many attributes that define the virtual object/scene and there are many different possible specifications for each of the many attributes, which can often result in enormous number of possible variations of the virtual object/scene. The graphical image designer is challenged to create an image of a particular version or instance of a particular virtual object and/or virtual scene that coheres with a particular context of the computer application and that satisfies one or more visual objectives. In various embodiments, the visual objectives can include providing visual variety, promoting visual interest, attracting attention, conveying meaning, provoking emotion, inviting contemplation, stimulating user interaction with the computer application, among many other visual objectives. Therefore, it is of interest to develop automatic and/or semi-automatic ways to assist the designer with the design of virtual objects and virtual scenes for use in computer applications. To this end, various systems and methods are disclosed herein by which a user, e.g., graphical image designer, can leverage artificial intelligence (AI) capabilities in assisting with generation of graphical images for use in computer applications.

In some situations, a designer is tasked with creating multiple different versions of a same virtual object and/or a same virtual scene. For example, a given context of a video game may require that the same virtual object/scene be presented in multiple different ways. For example, consider a video game that can be played in either realistic graphics mode, flat graphics mode, children's graphics mode, line-art graphics mode, cartoon graphics mode, caricature graphics mode, minimalist graphics mode, comics graphics mode, retro graphics mode, among essentially any other type of graphics mode. The video game graphics designer has to create the graphics for the various virtual objects/scenes and other graphical image content of the video game for each graphics mode of the video game that is to be offered. In some embodiments, the various virtual objects/scenes, content, and functionality of the video game remains essentially the same for the different graphics modes of the video game. Therefore, a significant advancement in graphics design efficiency and time-to-market is possible if the designer is equipped with AI-based tools to provide for automatic or semi-automatic creation of various virtual objects/scenes and other graphical image content of the video game for a given graphics mode of the video game based on corresponding objects/scenes and other graphical image content already generated for another graphics mode of the video game. More specifically, the designer can originate various virtual objects/scenes and other graphical image content of the video game for a first graphics mode of the video game, and then use the AI-based systems and methods disclosed herein to automatically and/or semi-automatically create the same various virtual objects/scenes and other graphical image content of the video game for a second graphics mode of the video game, with the original various virtual objects/scenes and other graphical image content of the video game for the first graphics mode of the video game being used as reference input by the AI-based systems and methods disclosed herein.

Various embodiments are disclosed herein for systems and methods for aligning outputs of different AI-based image generation systems. It is considered that multiple different AI-based image generation systems are provided for automatically generating a graphical image based on a set of linguistic input, e.g., a textual description of the image to be generated. In some embodiments, each of the multiple different AI-based image generations systems is configured and trained to generate a graphical image of a particular graphical image genre. Also, in these embodiments, each of the multiple different AI-based image generation systems is configured and trained to generate a different genre of graphical image relative to others of the multiple different AI-based image generation systems. In various embodiments, the different genres of graphical images, e.g., virtual objects and/or virtual scenes, generated by the multiple different AI-based image generation systems include one or more of abstract, action, alien, apocalyptic, architectural, ancient, anime, antique, art-deco, art-nouveau, avatar, baroque, bauhaus, caricature, cartoon, chibi, children's book, comics, contemporary, cubism, cyberpunk, decoupage, dreamscape, dystopian, elven-world, emoji, ethnic, fairytale, fantasy, flat, fresco, futuristic, gothic, grotesque, haunted, hologram, impressionist, line-art, logo, manga, mechanica, minimalist, mystical, mythological, neo-noir, oceanic, photorealistic, pixel-art, pixel-world, pop-art, post-impressionist, psychedelic, realistic, renaissance, retro, romantic-art, rural, satire, science fiction, space, stained glass, steampunk, street-art, superhero, supernatural, surreal, three-dimensional character, three-dimensional object, tribal, urban, vintage, watercolor, western, among many other genres.

In some embodiments, a first AI-based image generation system is engaged to generate a reference image based on an initial input specification that provides a linguistic, e.g., textual, description of the image to be generated. Then, a second AI-based image generation system is engaged to automatically generate another image that substantially matches, e.g., looks like or aligns with, the reference image. Operating the second AI-based image generation system to achieve the other image that substantially matches reference image is generally an iterative process that requires generation of many trial images and accompanying assessment of how well each trial image matches the reference image until a sufficient match is deemed to have been achieved. This iterative process includes adjustment and refinement of the linguistic description of the image to be generated in order to provide different input specifications to the second AI-based image generation system for generating the various trial images. The systems and methods disclosed herein provide for automatic control and direction of the above-mentioned iterative process to achieve an image generated by the second AI-based image generation system that substantially matches the reference image generated by the first AI-based image generation system. The systems and methods disclosed herein implement various AI models to automatically compare the various trial images and the reference image during the iterative process. The systems and methods disclosed herein also implement various AI models to automatically generate the revised/updated linguistic input to the second AI-based image generation system for each iteration of the iterative process. Also, in some embodiments, if the generated trial images do not converge to substantially match the reference image within a specified maximum number of iterations, the system and methods disclosed herein implement various AI models to automatically generate a revised/updated linguistic input to the first AI-based image generation system to generate an updated/revised reference image that resolves problematic features/characteristics of the previous version of the reference image that were not being successfully matched by the trial images. In various embodiments, the first AI-based image generation system is configured and trained to generate the reference image in accordance with a first genre, and the second AI-based image generation system is configured and trained to generate the trial image in accordance with a second genre. In some embodiments, the first and second genres are substantially the same. In some embodiments, the first and second genres are different.

FIG. 1 shows a system 100 for aligning graphical image outputs of different AI-based image generation systems, in accordance with some embodiments. The system 100 includes an input processor 101 configured to receive an initial input for AI-based image generation 141. In some embodiments, the initial input for AI-based image generation 141 is a linguistic description of a graphical image. In some embodiments, the initial input for AI-based image generation 141 is specified as textual input. In some embodiments, the initial input for AI-based image generation 141 is specified through verbal/audio input that is transcribed into textual input. In various embodiments, the graphical image is essentially any graphical image that is displayable on a display screen of a computer system. In various embodiments, the graphical image is essentially any type of graphical image that displayable by a computer application, such as a video game. The input processor 101 is also configured to receive a specification of a minimum required image match score 143. In some embodiments, the minimum required image match score 143 represents the percentage of a reference image 107 that is substantially matched by a trial image 109. In some embodiments, the minimum required image match score 143 is computed as a percentage of AI-classified and AI-labeled distinguishing features within the reference image 107 that have substantially matching AI-classified and AI-labeled distinguishing features within the trial image 109.

The system 100 includes a first AI-based image generation system 103 configured to generate and output the reference image 107, as indicated by arrow 106, based on a reference input specification 146. In some embodiments, the reference input specification 146 is a linguistic description of a graphical image, e.g., a textual description of the image. The reference input specification 146 is initially set equal to the initial input for AI-based image generation 141 as received through the input processor 101. More specifically, the first AI-based image generation system 103 receives the initial input for AI-based image generation 141 from the input processor 101, as indicated by arrow 102, and initializes the reference input specification 146 to the initial input for AI-based image generation 141. The first AI-based image generation system 103 includes one or more AI model(s) 145 configured and trained to generate a first genre of graphical image. For ease of description, the one or more AI model(s) 145 is referred to hereafter as a first AI model 145. It should also be understood that the first AI-based image generation system 103 is implemented as a combination of rules-based algorithms and one or more AI models, including at least the first AI model 145.

The system 100 also includes a second AI-based image generation system 105 configured to generate and output the trial image 109, as indicated by arrow 108, based on a trial input specification 148. In some embodiments, the trial input specification 148 is a linguistic description of a graphical image, e.g., a textual description of the image. The trial input specification 148 is initially set equal to the initial input for AI-based image generation 141 as received through the input processor 101. More specifically, the second AI-based image generation system 105 receives the initial input for AI-based image generation 141 from the input processor 101, as indicated by arrow 104, and initializes the trial input specification 148 to the initial input for AI-based image generation 141. The second AI-based image generation system 105 is different than the first AI-based image generation system 103. The second AI-based image generation system 105 includes one or more AI model(s) 147 configured and trained to generate a second genre of graphical image.

In some embodiments, the second genre of graphical image generated by the second AI-based image generation system 105 is different than the first genre of graphical image generated by the first AI-based image generation system 103. However, in some embodiments, the second genre of graphical image generated by the second AI-based image generation system 105 is substantially similar to the first genre of graphical image generated by the first AI-based image generation system 103. For ease of description, the one or more AI model(s) 147 is referred to hereafter as a second AI model 147. It should also be understood that the second AI-based image generation system 105 is implemented as a combination of rules-based algorithms and one or more AI models, including at least the second AI model 147.

The system 100 also includes an image matching assessment system 111 configured to receive as input a current version of the reference image 107, as indicated by arrow 110. The image matching assessment system 111 is also configured to receive as input a current version of the trial image 109, as indicated by arrow 112. The image matching assessment system 111 is configured to process the trial image 109 and the reference image 107 through an image analysis AI model 149 to determine an amount of similarity between the trial image 109 and the reference image 107. In some embodiments, the image matching assessment system 111 is configured to automatically identify a given distinguishing feature within a given image (reference image 107 and/or trial image 109) by determining an outline and content of the given distinguishing feature within the given image. In some embodiments, the image analysis AI model 149 is configured to implement a pixel-level analysis of the given image to automatically identify pixels associated with the outline and content of the given distinguishing feature within the given image.

In some embodiments, the image analysis AI model 149 is configured to automatically extract and characterize attributes of distinguishing features within each of the reference image 107 and the trial image 109. In some embodiments, the image analysis AI model 149 is configured to analyze the current version of the reference image 107 to identify and characterize a first set of one or more distinguishing features within the current version of the reference image 107. Also, in these embodiments, the image analysis AI model 149 is configured to analyze the current version of the trial image 109 to identify and characterize a second set of one or more distinguishing features within the current version of the trial image 109. Also, in these embodiments, the image analysis AI model 149 is configured to classify and label identified candidate features within the current version of the reference image 107. Also, in these embodiments, the image matching assessment system 111 is configured to filter the classified and labeled candidate features within the current version of the reference image 107 in accordance with a number of filter parameters to determine the first set of one or more distinguishing features within the current version of the reference image 107. Also, in these embodiments, the image analysis AI model 149 is configured to classify and label identified candidate features within the current version of the trial image 109. Also, in these embodiments, the image matching assessment system 111 is configured to filter the classified and labeled candidate features within the current version of the trial image 109 in accordance with the number of filter parameters to determine the second set of one or more distinguishing features within the current version of the trial image 109. In some of these embodiments, the number of filter parameters includes a minimum size for a given distinguishing feature within a given image (reference image 107 and/or trial image 109). For example, in some embodiments, the minimum size for a given distinguishing feature within a given image is specified as a percentage of a total size of the given image occupied by the given distinguishing feature. In another example, in some embodiments, the minimum size for a given distinguishing feature within a given image is specified as a total number of pixels used to display the given distinguishing feature within the given image.

The image matching assessment system 111 is also configured to generate a current image match score 151 based on the determined amount of similarity between the current version of the trial image 109 and the current version of the reference image 107. In some embodiments, the image matching assessment system 111 is configured to generate the current image match score 151 by evaluating a number of comparison parameters for correlated distinguishing features in the current version of the reference image 107 and the current version of the trial image 109. In some embodiments, the number of comparison parameters includes one or more of a feature size, a feature shape, a feature contextual position, a feature spatial orientation, a feature texture, a feature color, a feature-to-feature relationship, a pixel intensity gradient, a pixel color, and a pixel-level color gradient, among other comparison parameters.

The system 100 also includes a trial input specification adjustment engine 115 configured to generate a revised version of the trial input specification 148 for use in generation of a new version of the trial image 109 by the second AI-based image generation system 105 that provides for an increase of the current image match score 151. The output of the image analysis AI model 149 and the current image match score 151 are provided as inputs to the trial input specification adjustment engine 115, as indicated by arrow 116. When the current image match score 151 is less than the minimum required image match score 143 as specified through the input processor 101, the trial input specification adjustment engine 115 is engaged to determine a revised version of the trial input specification 148 that will drive the second AI-based image generation system 105 to generate a new trial image 109 that better matches (e.g., better aligns with) the current version of the reference image 107. The revised version of the trial input specification 148 is conveyed from the trial input specification adjustment engine 115 to the second AI-based image generation system 105, as indicated by arrow 120. The output of the image analysis AI model 149 of the image matching assessment system 111 provides image mismatch information to the trial input specification adjustment engine 115 indicating how the current version of the trial image 109 is not matching/aligning with the current version of the reference image 107. The trial input specification adjustment engine 115 uses the image mismatch information to automatically generate a revision of the trial input specification 148 that will drive the second AI-based image generation system 105 to generate a new version of the trial image 109 that yields a higher current image match score 151 when processed through the image matching assessment system 111. For example, in some embodiments, the trial input specification adjustment engine 115 is configured to generate a revision of the trial input specification 148 for the second AI-based image generation system 105 that will reduce or eliminate one or more mismatches between a portion of (or given feature displayed within) the current version of the reference image 107 and a corresponding portion of (or given feature displayed within) the current version of the trial image 109.

The system also includes a controller 117 that is configured to direct iterative operation of the second AI-based image generation system 105, the image matching assessment system 111, and the trial input specification adjustment engine 115 until the current image match score 151 is equal to or greater than the minimum required image match score 143 as specified through the input processor 101. The controller 117 is in bi-directional data communication with the input processor 101, as indicated by arrow 136. The controller 117 is also in bi-directional data communication with the first AI-based image generation system 103, as indicated by arrow 134. The controller 117 is also in bi-directional data communication with the second AI-based image generation system 105, as indicated by arrow 132. The controller 117 is also in bi-directional data communication with the image matching assessment system 111, as indicated by arrow 124. The controller 117 is also in bi-directional data communication with the trial input specification adjustment engine 115, as indicated by arrow 130.

The controller 117 is configured to direct when the initial input for AI-based image generation 141 is conveyed from the input processor 101 to the first AI-based image generation system 103 for generation of the initial version of the reference image 107. The controller 117 is also configured to direct when the initial input for AI-based image generation 141 is conveyed from the input processor 101 to the second AI-based image generation system 105 for generation of the initial version of the trial image 109. The controller 117 is also configured to direct when current version of the reference image 107 and the current version of the trial image 109 are conveyed to the image matching assessment system 111 for processing by the image analysis AI model 149 to generate the current image match score 151. The controller 117 is also configured to direct when the output of the image analysis AI model 149 and the current image match score 151 are conveyed to the trial input specification adjustment engine 115. The controller 117 is also configured to direct when the trial input specification adjustment engine 115 is engaged to generate the revision of the trial input specification 148 for the second AI-based image generation system 105. The controller 117 is also configured to direct when the revision of the trial input specification 148 is conveyed from the trial input specification adjustment engine 115 to the second AI-based image generation system 105. The controller 117 is also configured to direct when the second AI-based image generation system 105 is engaged to generate a new version of the trial image 109 based on the revision of the trial input specification 148 as received from the trial input specification adjustment engine 115. In this manner, the controller 117 is configured to control operation of the system 100 in an iterative manner to obtain a current version of the trial image 109 that sufficiently matches (aligns with) a current version of the reference image 107, such that the current image match score 151 for the current version of the trial image 109 relative to the current version of the reference image 107 is greater than or equal to the minimum required image match score 143 as specified through the input processor 101.

The system 100 also includes an output processor 119 that is configured to format and convey as output (to the user of the system 100) each of the current version of the reference input specification 146, the current version of the reference image 107, the current version of the trial input specification 148, the current version of the trial image 109, and the current image match score 151, when the current image match score 151 is determined to be equal to or greater than the minimum required image match score 143. The controller 117 is in bi-directional data communication with the output processor 119, as indicated by arrow 128. The controller 117 directs when the output processor 119 is engaged to format and convey the outputs as indicated above. In some embodiments, the output processor 119 receives the current version of the reference input specification 146, the current version of the reference image 107, the current version of the trial input specification 148, the current version of the trial image 109, and the current image match score 151 from the image matching assessment system 111, as indicated by arrow 122. In other embodiments, the output processor 119 receives the current version of the reference input specification 146, the current version of the reference image 107, the current version of the trial input specification 148, the current version of the trial image 109, and the current image match score 151 from the controller 117, as indicated by arrow 128.

In some embodiments, sufficient matching/alignment convergence of the trial image 109 to the reference image 107 is not attainable within a specified maximum allowed number of iterations 153 of trial image 109 generation. In some embodiments, the system 100 provides for specification of the maximum allowed number of iterations allowed 153 through the input processor 101 by the user of the system 100. In some embodiments, the current reference image 107 is designed in such a way that the system 100 is unable to generate a current trial image 109 with an accompanying current image match score 151 that is greater than or equal to the minimum required image match score 143 in the specified maximum allowed number of iterations 153 of trial image 109 generation. In some embodiments, the system 100 implements a reference input specification adjustment engine 113 to manage the lack of sufficient matching/alignment convergence of the trial image 109 to the reference image 107 within the specified maximum allowed number of iterations 153 of trial image 109 generation. The reference input specification adjustment engine 113 is configured to generate a revised version of the reference input specification 146 for use in generation of a new version of the reference image 107 by the first AI-based image generation system 103. In some embodiments, the reference input specification adjustment engine 113 is configured to receive as inputs the output of the image analysis AI model 149 and the current image match score 151 from the image matching assessment system 111, as indicated by arrow 114. Using the output of the image analysis AI model 149, the reference input specification adjustment engine 113 is informed of which one or more portion(s) and/or distinguishing feature(s) of the current version of the reference image 107 are problematic in that they are not being sufficiently matched by the current version of the trial image 109. The reference input specification adjustment engine 113 is configured to generate a revised version of the reference input specification 146 that seeks to mitigate or eliminate the problematic portion(s) and/or distinguishing feature(s) of the reference image 107, with the objective of enabling matching/alignment convergence of the trial image 109 to the reference image 107 within the specified maximum allowed number of iterations 153 of trial image 109 generation.

The revised version of the reference input specification 146 is conveyed from the reference input specification adjustment engine 113 to the first AI-based image generation system 103, as indicated by arrow 118. The first AI-based image generation system 103 uses the revised version of the reference input specification 146 to generate a new current version of the reference image 107. The system 100 reinitializes the trial image 109 by directing the second AI-based image generation system 105 to use the revised version of the reference input specification 146 as the trial input specification 148 to generate a new current version of the trial image 109. Then, the system 100 proceeds with the iterative process of trial image 109 generation, matching assessment, and corresponding image match score 151 computation based on the new current version of the reference image 107.

The controller 117 is in bi-directional data communication with the reference input specification adjustment engine 113, as indicated by arrow 126. In some embodiments, the controller 117 is configured to increment a trial iteration counter 150 for each time the second AI-based image generation system 105 generates the new current version of the trial image 109 based on the revised version of the trial input specification 148 as generated by the trial input specification adjustment engine 115. Also, in these embodiments, the controller 117 is further configured to direct the reference input specification adjustment engine 113 to generate the revised version of the reference input specification 146 and to direct the first AI-based image generation system 103 to generate the new current version of the reference image 107 when the trial iteration counter 150 exceeds the specified maximum allowed number of iterations 153. Also, in these embodiments, the controller 117 is further configured to direct the second AI-based image generation system 105 to use the revised version of the reference input specification 146 as the trial input specification 148 to generate a new current version of the trial image 109 when the revised version of the reference input specification 146 is used by the first AI-based image generation system 103 to generate the new current version of the reference image 107.

The controller 117 is configured to initialize the trial iteration counter 150 to zero each time the trial input specification 148 that is provided to the second AI-based image generation system 105 matches the reference input specification 146 that is provided to the first AI-based image generation system 103. Therefore, the trial iteration counter 150 is initialized to zero when the initial input for AI-based image generation 141 is used as both the reference input specification 146 for the first AI-based image generation system 103 and as the trial input specification 148 for the second AI-based image generation system 105. Also, the trial iteration counter 150 is initialized to zero when the revised version of the reference input specification 146 is used for both the reference input specification 146 to the first AI-based image generation system 103 and the trial input specification 148 to the second AI-based image generation system 105.

It should be understood that the system 100 is operable by a user, e.g., designer, to automatically and/or semi-automatically create multiple versions, e.g., genres, of a given graphical image. In some embodiments, the multiple versions of the given graphical image, as generated by the system 100, are associated with a computer application, such as a video game. In some embodiments, the multiple versions of the given graphical image correspond to graphics scenes that are displayed by a computer application. In some embodiments, the multiple versions of the given graphical image correspond to virtual objects that are displayed by a computer application.

Figure 2:
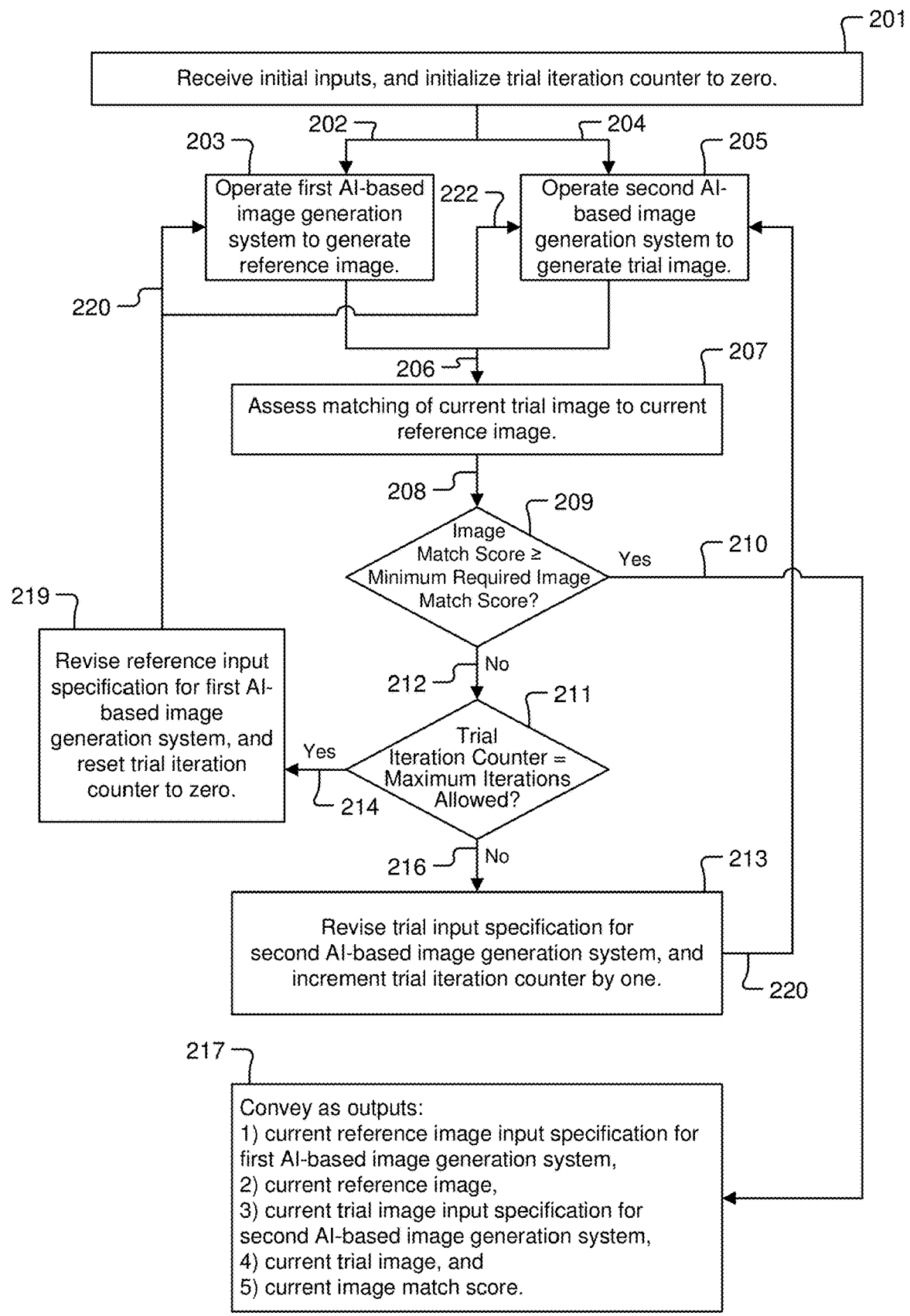
FIG. 2 shows a flowchart of a method for aligning graphical image outputs of different AI-based image generation systems, in accordance with some embodiments.

FIG. 2 shows a flowchart of a method for aligning graphical image outputs of different AI-based image generation systems, in accordance with some embodiments. The method includes an operation 201 for receiving initial input that includes the initial input for AI-based image generation 141 and the specification of the minimum required image match score 143. The operation 201 also includes initializing the trial iteration counter 150 to zero. From the operation 201, the method proceeds with an operation 203, as indicated by arrow 202, for operating the first AI-based image generation system 103 to generate the current version of the reference image 107 based on the reference input specification 146, where the reference input specification 146 is initially set equal to the initial input for AI-based image generation 141. Also, from the operation 201, the method proceeds with an operation 205, as indicated by arrow 204, for operating the second AI-based image generation system 105 to generate the current version of the trial image 109 based on the trial input specification 148, where the trial input specification 148 is initially set equal to the initial input for AI-based image generation 141. It should be understood that the second AI-based image generation system 105 is different than the first AI-based image generation system 103. In some embodiments, the operation 203 includes executing one or more image generation AI model(s) to generate a first genre of graphical image, and the operation 205 includes executing one or more image generation AI model(s) to generate a second genre of graphical image. In some embodiments, the second genre is different from the first genre. In some embodiments, the second genre is substantially the same as the first genre. In some embodiments, each of the initial input for AI-based image generation 141, the reference input specification 146, and the trial input specification 148 is a respective linguistic description of an image, e.g., a textual or verbal/audio description of the image.

From the operations 203 and 205, the method proceeds with an operation 207, as indicated by arrow 206, for processing the current version of the trial image 109 and the current version of the reference image 107 through the image analysis AI model 149 of the image matching assessment system 111 to determine an amount of similarity between the current version of the trial image 109 and the current version of the reference image 107. The operation 207 also includes generating the current image match score 151 for the current version of the trial image 109 based on the determined amount of similarity between the current version of the trial image 109 and the current version of the reference image 107. In some embodiments, generating the current image match score 151 in the operation 207 includes evaluating a number of comparison parameters for correlated distinguishing features in the reference image 107 and the trial image 109. In some embodiments, the number of comparison parameters include one or more of a feature size, a feature shape, a feature contextual position, a feature spatial orientation, a feature texture, a feature color, a feature-to-feature relationship, a pixel intensity gradient, a pixel color, and a pixel-level color gradient, among other comparison parameters.

In some embodiments, operation 207 includes operating the image analysis AI model 149 to automatically identify a given distinguishing feature within a given image by determining an outline and content of the given distinguishing feature within the given image. In some embodiments, operation 207 includes operating the image analysis AI model 149 to automatically identify pixels associated with the outline and content of the given distinguishing feature within the given image. In some embodiments, operation 207 includes operating the image analysis AI model 149 to automatically identify and characterize a first set of one or more distinguishing features within the reference image 107, and to automatically identify and characterize a second set of one or more distinguishing features within the trial image 109. In some embodiments, the operation 207 also includes operating the image analysis AI model 149 to automatically classify and label identified candidate features within the reference image 107, and filter the classified and labeled candidate features within the reference image 107 in accordance with a number of filter parameters to determine the first set of one or more distinguishing features within the reference image 107. Also, in these embodiments, the operation 207 includes operating the image analysis AI model 149 to automatically classify and label identified candidate features within the trial image 109, and filter the classified and labeled candidate features within the trial image 109 in accordance with the number of filter parameters to determine the second set of one or more distinguishing features within the trial image 109. In some embodiments, the number of filter parameters includes a minimum size for a given distinguishing feature within a given image, where the minimum size is specified as either a percentage of a total size of the given image occupied by the given distinguishing feature, or as a total number of pixels used to display the given distinguishing feature within the given image.

From the operation 207, the method proceeds with an operation 209, as indicated by arrow 208, to determine whether or not the current image match score 151 is greater than or equal to the minimum required image match score 143. If the current image match score 151 is not greater than or equal to the minimum required image match score 143, the method proceeds with an operation 211, as indicated by arrow 212, for determining whether or not the trial iteration counter 150 is equal to the maximum allowed number of iterations 153. If the trial iteration counter 150 is not equal to the maximum allowed number of iterations 153, the method proceeds with an operation 213, as indicated by arrow 216, for operating the trial input specification adjustment engine 115 to generate a revised version of the trial input specification 148 for use in generation of a new version of the trial image 109 by the second AI-based image generation system 105 that provides for an increase of the image match score 151. Also, as part of the operation 213, the method includes incrementing the trial iteration counter 150 by one.

From the operation 213, the method proceeds back to the operation 205, as indicated by arrow 220. In this manner, the method continues with the next iteration of operating the second AI-based image generation system 105 to generate the new version of the trial image 109 and assessing the matching of the new version of the trial image 109 to the reference image 107, with corresponding computing of the image match score 151 for the new version of the trial image 109, and with corresponding determination of whether or not the minimum required image match score 143 is met or exceeded by the image match score 151 for the new version of the trial image 109.

With reference back to operation 211, if the trial iteration counter 150 is equal to the maximum allowed number of iterations 153, the method proceeds with an operation 219, as indicated by arrow 214, for operating the reference input specification adjustment engine 113 to generate a revised version of the reference input specification 146. The operation 219 also includes resetting the trial iteration counter 150 to zero. From the operation 219, the method proceeds back to the operation 203, as indicated by arrow 220, for operating the first AI-based image generation system 103 to generate a new current version of the reference image 107 based on the revised version of the reference input specification 146. Also, from the operation 210, the method proceeds back to the operation 205, as indicated by arrow 222, for operating the second AI-based image generation system 105 to generate a new current version of the trial image 109 based on a current version of the trial input specification 148 that is set equal to the revised version of the reference input specification 146. Also, with reference back to operation 209, if the current image match score 151 is greater than or equal to the minimum required image match score 143, the method proceeds with an operation 217, as indicated by arrow 210, for formatting and conveying as output each of the current reference input specification 146, the current reference image 107, the current trial input specification 148, the current trial image 109, and the current image match score 151.

Figure 3A:
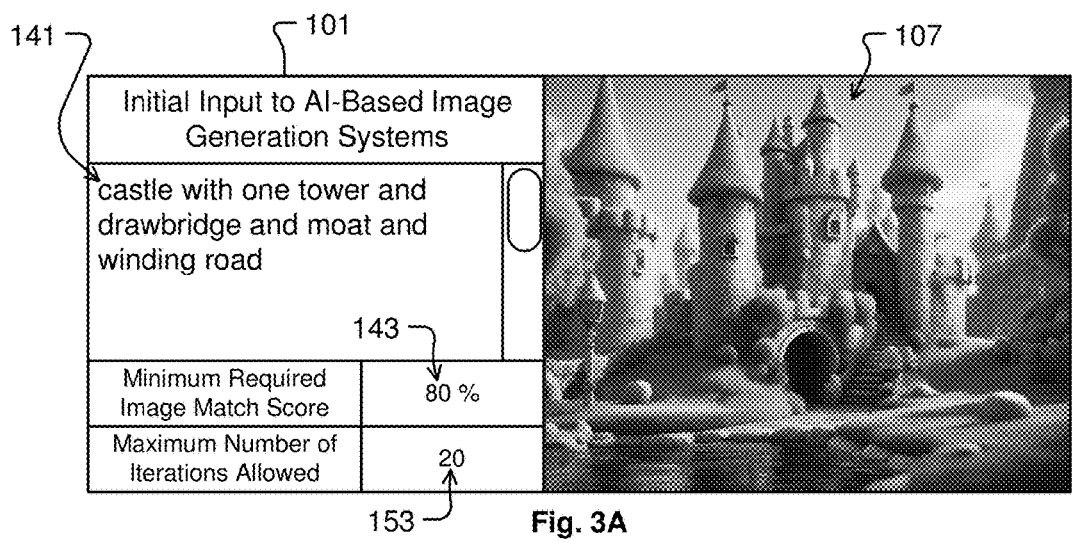
FIG. 3A shows an example of the initial inputs received through the input processor, in accordance with some embodiments.

FIG. 3A shows an example of the initial inputs received in the operation 201 through the input processor 101, in accordance with some embodiments. The example initial inputs include the initial input for AI-based image generation 141, the minimum required image match score 143, and the maximum allowed number of iterations 153. By way of non-limiting example, the initial input for AI-based image generation 141 is specified as "castle with one tower and drawbridge and moat and winding road." Also, by way of non-limiting example, the minimum required image match score 143 is specified as 80%. Also, by way of non-limiting example, the maximum allowed number of iterations 153 is specified as 20. FIG. 3A also shows an example of the reference image 107 generated in the operation 203 by the first AI-based image generation system 103 using the initial input for AI-based image generation 141 as the reference input specification 146.

Figure 3B:
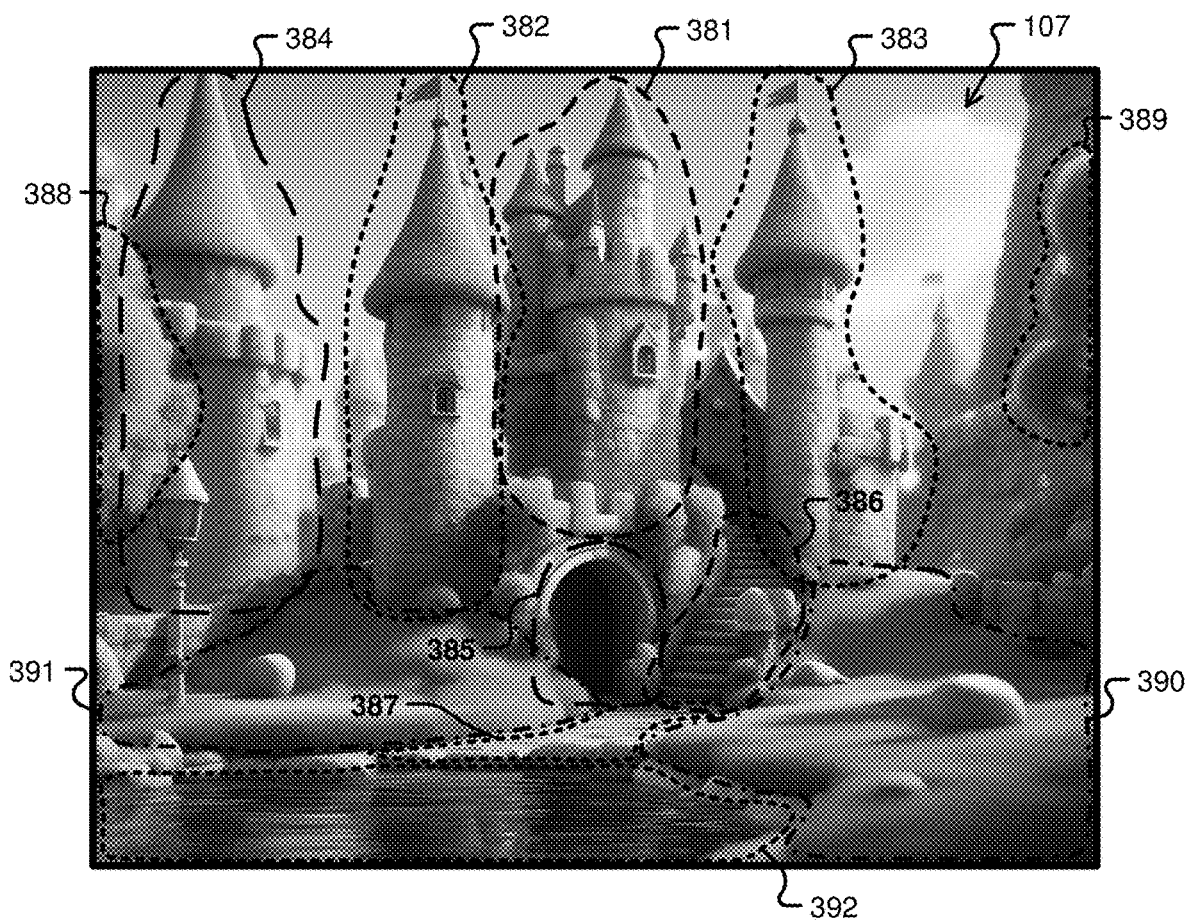
FIG. 3B shows an example first set of distinguishing features within the example reference image, as identified by the image analysis AI model of the image matching assessment system, in accordance with some embodiments.

FIG. 3B shows an example first set of distinguishing features within the example reference image 107, as identified in the operation 207 by the image analysis AI model 149 of the image matching assessment system 111, in accordance with some embodiments. The example first set of distinguishing features within the example reference image 107 include a feature 381 classified as a "tower" and labeled as "center tower." The example first set of distinguishing features within the example reference image 107 also include a feature 382 classified as a "tower" and labeled as "corner tower." The example first set of distinguishing features within the example reference image 107 also include a feature 383 classified as a "tower" and labeled as "corner tower." The example first set of distinguishing features within the example reference image 107 also include a feature 384 classified as a "tower" and labeled as "detached tower." The example first set of distinguishing features within the example reference image 107 also include a feature 385 classified as a "entrance" and labeled as "archway." The example first set of distinguishing features within the example reference image 107 also include a feature 386 classified as a "stairs" and labeled as "side staircase." The example first set of distinguishing features within the example reference image 107 also include a feature 387 classified as a "pathway" and labeled as "entrance path." The example first set of distinguishing features within the example reference image 107 also include a feature 388 classified as a "tree" and labeled as "front-side tree." The example first set of distinguishing features within the example reference image 107 also include a feature 389 classified as a "tree" and labeled as "front-side tree." The example first set of distinguishing features within the example reference image 107 also include a feature 390 classified as a "grass" and labeled as "front lawn." The example first set of distinguishing features within the example reference image 107 also include a feature 391 classified as a "grass" and labeled as "front lawn." The example first set of distinguishing features within the example reference image 107 also include a feature 392 classified as a "water" and labeled as "front pond."

Figure 3C:
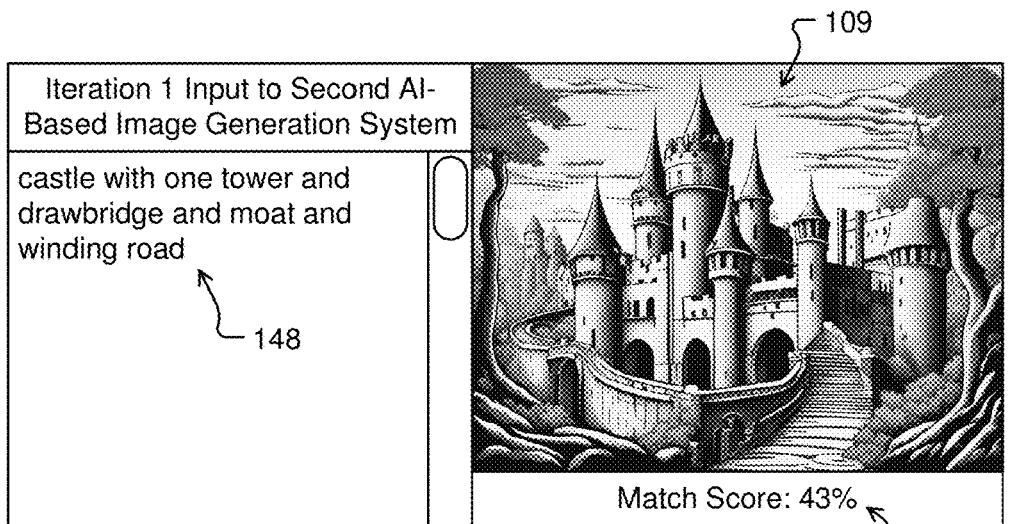
FIG. 3C shows the trial input specification and corresponding trial image, as generated by the second AI-based image generation system, for a first trial image generation and assessment iteration by the system, in accordance with some embodiments.

FIG. 3C shows the trial input specification 148 and corresponding trial image 109, as generated by the second AI-based image generation system 105, for a first trial image 109 generation and assessment iteration by the system 100, in accordance with some embodiments. For the first trial image 109 generation and assessment iteration, the trial input specification 148 is initialized to the initial input for AI-based image generation 141 as received through the input processor 101. FIG. 3C shows that the current image match score 151 for the current trial image 109 of the first iteration is 43%. Because the current image match score 151 of 43% is less than the minimum required image match score 143 of 80%, the system 100 proceeds with another trial image 109 generation and assessment iteration.

Figure 3D:
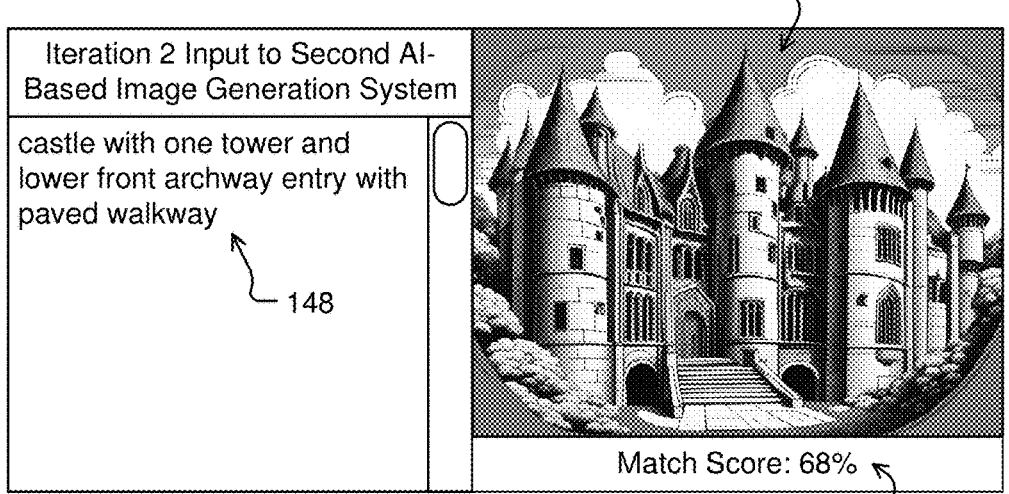
FIG. 3D shows the trial input specification and corresponding trial image, as generated by the second AI-based image generation system, for a second trial image generation and assessment iteration by the system, in accordance with some embodiments.

FIG. 3D shows the trial input specification 148 and corresponding trial image 109, as generated by the second AI-based image generation system 105, for a second trial image 109 generation and assessment iteration by the system 100, in accordance with some embodiments. For the second trial image 109 generation and assessment iteration, the trial input specification 148 is revised by the trial input specification adjustment engine 115 from the trial input specification 148 used in the first trial image 109 generation and assessment iteration. The revised trial input specification 148 is based on the differences between the current trial image 109 and the current reference image 107 as determined by the image analysis AI model 149 of the image matching assessment system 111 during the second trial image 109 generation and assessment iteration. FIG. 3D shows that the current image match score 151 for the current trial image 109 of the second iteration improved from 43% to 68%. Because the current image match score 151 of 68% is less than the minimum required image match score 143 of 80%, the system 100 proceeds with another trial image 109 generation and assessment iteration.

Figure 3E:
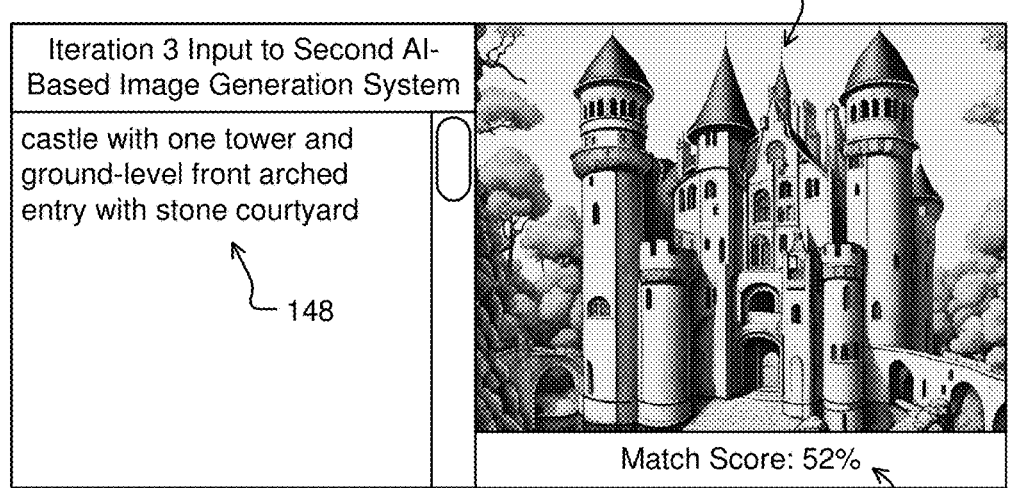
FIG. 3E shows the trial input specification and corresponding trial image, as generated by the second AI-based image generation system, for a third trial image generation and assessment iteration by the system, in accordance with some embodiments.

FIG. 3E shows the trial input specification 148 and corresponding trial image 109, as generated by the second AI-based image generation system 105, for a third trial image 109 generation and assessment iteration by the system 100, in accordance with some embodiments. For the third trial image 109 generation and assessment iteration, the trial input specification 148 is revised by the trial input specification adjustment engine 115 from the trial input specification 148 used in the second trial image 109 generation and assessment iteration. The revised trial input specification 148 is based on the differences between the current trial image 109 and the current reference image 107 as determined by the image analysis AI model 149 of the image matching assessment system 111 during the third trial image 109 generation and assessment iteration. FIG. 3E shows that the current image match score 151 for the current trial image 109 of the third iteration declined from 68% to 52%. Because the current image match score 151 of 52% is less than the minimum required image match score 143 of 80%, the system 100 proceeds with another trial image 109 generation and assessment iteration.

Figure 3F:
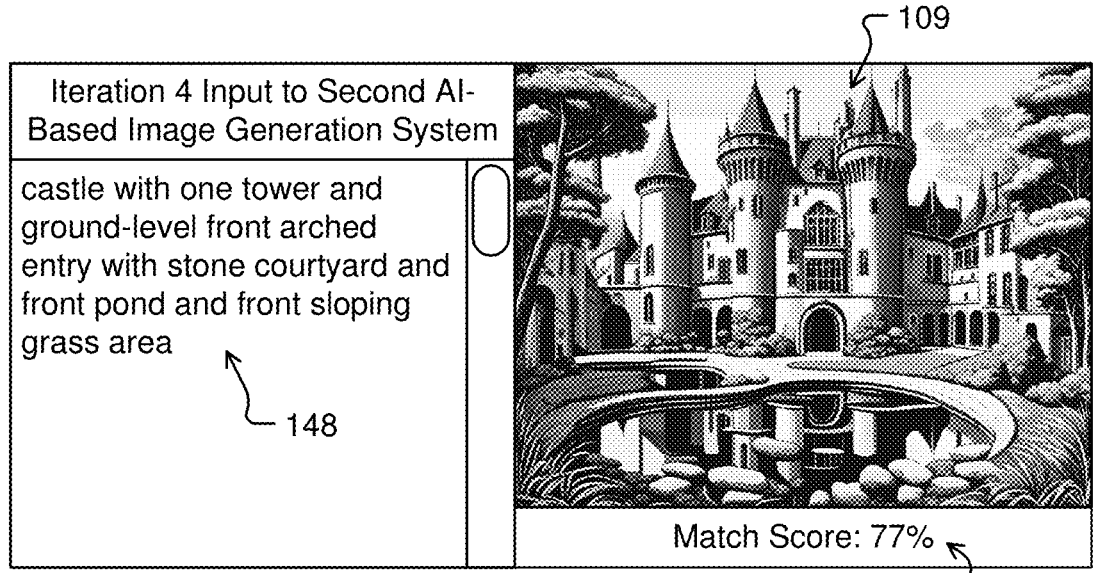
FIG. 3F shows the trial input specification and corresponding trial image, as generated by the second AI-based image generation system, for a fourth trial image generation and assessment iteration by the system, in accordance with some embodiments.

FIG. 3F shows the trial input specification 148 and corresponding trial image 109, as generated by the second AI-based image generation system 105, for a fourth trial image 109 generation and assessment iteration by the system 100, in accordance with some embodiments. For the fourth trial image 109 generation and assessment iteration, the trial input specification 148 is revised by the trial input specification adjustment engine 115 from the trial input specification 148 used in the third trial image 109 generation and assessment iteration. The revised trial input specification 148 is based on the differences between the current trial image 109 and the current reference image 107 as determined by the image analysis AI model 149 of the image matching assessment system 111 during the fourth trial image 109 generation and assessment iteration. FIG. 3F shows that the current image match score 151 for the current trial image 109 of the fourth iteration improved from 52% to 77%. Because the current image match score 151 of 77% is less than the minimum required image match score 143 of 80%, the system 100 proceeds with another trial image 109 generation and assessment iteration.

Figure 3G:
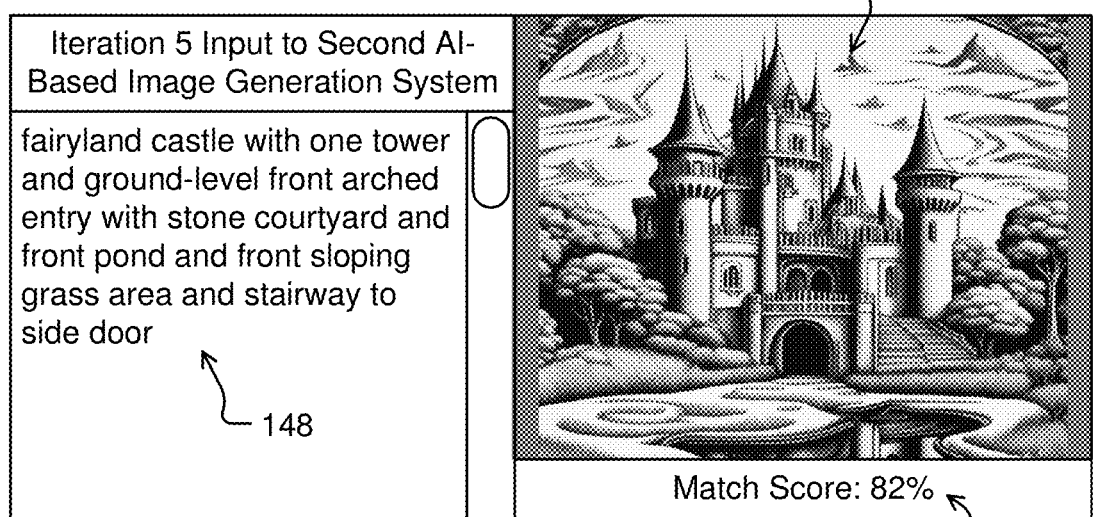
FIG. 3G shows the trial input specification and corresponding trial image, as generated by the second AI-based image generation system, for a fifth trial image generation and assessment iteration by the system, in accordance with some embodiments.

FIG. 3G shows the trial input specification 148 and corresponding trial image 109, as generated by the second AI-based image generation system 105, for a fifth trial image 109 generation and assessment iteration by the system 100, in accordance with some embodiments. For the fifth trial image 109 generation and assessment iteration, the trial input specification 148 is revised by the trial input specification adjustment engine 115 from the trial input specification 148 used in the fourth trial image 109 generation and assessment iteration. The revised trial input specification 148 is based on the differences between the current trial image 109 and the current reference image 107 as determined by the image analysis AI model 149 of the image matching assessment system 111 during the fifth trial image 109 generation and assessment iteration. FIG. 3G shows that the current image match score 151 for the current trial image 109 of the fifth iteration improved from 77% to 82%. Because the current image match score 151 of 82% is greater than the minimum required image match score 143 of 80%, the system 100 proceeds to engage the output processor 119 to format and convey as output (to the user of the system 100) each of the current version of the reference input specification 146, the current version of the reference image 107, the current version of the trial input specification 148, the current version of the trial image 109, and the current image match score 151.

Figure 3H:
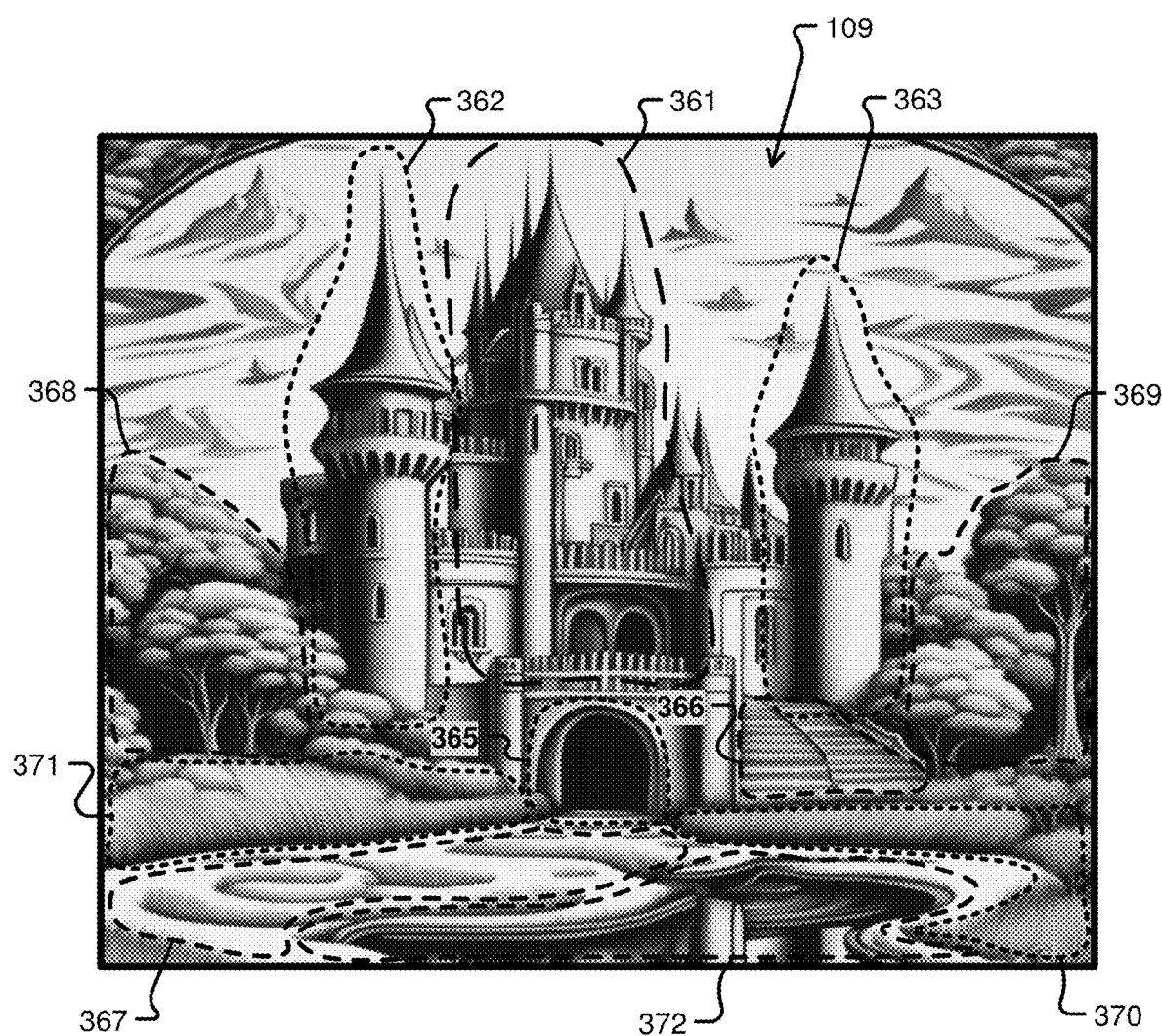
FIG. 3H shows an example second set of distinguishing features within the example trial image of the fifth iteration, as identified by the image analysis AI model of the image matching assessment system, in accordance with some embodiments.

FIG. 3H shows an example second set of distinguishing features within the example trial image 109 of the fifth iteration, as identified in the operation 207 by the image analysis AI model 149 of the image matching assessment system 111, in accordance with some embodiments. The example second set of distinguishing features within the example trial image 109 include a feature 361 classified as a "tower" and labeled as "center tower." The example second set of distinguishing features within the example trial image 109 also include a feature 362 classified as a "tower" and labeled as "corner tower." The example second set of distinguishing features within the example trial image 109 also include a feature 363 classified as a "tower" and labeled as "corner tower." The example second set of distinguishing features within the example trial image 109 also include a feature 365 classified as a "entrance" and labeled as "archway." The example second set of distinguishing features within the example trial image 109 also include a feature 366 classified as a "stairs" and labeled as "side staircase." The example second set of distinguishing features within the example trial image 109 also include a feature 367 classified as a "pathway" and labeled as "entrance path." The example second set of distinguishing features within the example trial image 109 also include a feature 368 classified as a "tree" and labeled as "front-side tree." The example second set of distinguishing features within the example trial image 109 also include a feature 369 classified as a "tree" and labeled as "front-side tree." The example second set of distinguishing features within the example trial image 109 also include a feature 370 classified as a "grass" and labeled as "front lawn." The example second set of distinguishing features within the example trial image 109 also include a feature 371 classified as a "grass" and labeled as "front lawn." The example second set of distinguishing features within the example trial image 109 also include a feature 372 classified as a "water" and labeled as "front pond." Therefore, in comparing the second set of distinguishing features within the example trial image 109 of the fifth iteration with the first set of distinguishing features within the example reference image 107, as shown in FIG. 3B, the primary difference is the absence of the "detached tower" in the trial image 109. However, the feature-to-feature similarities between the example first set of distinguishing features within the example reference image 107 and the example second set of distinguishing features within the example trial image 109 yield a current image match score 151 of 82% is sufficient to satisfy the minimum required image match score 143 of 80% in the present example.

Figure 3I:
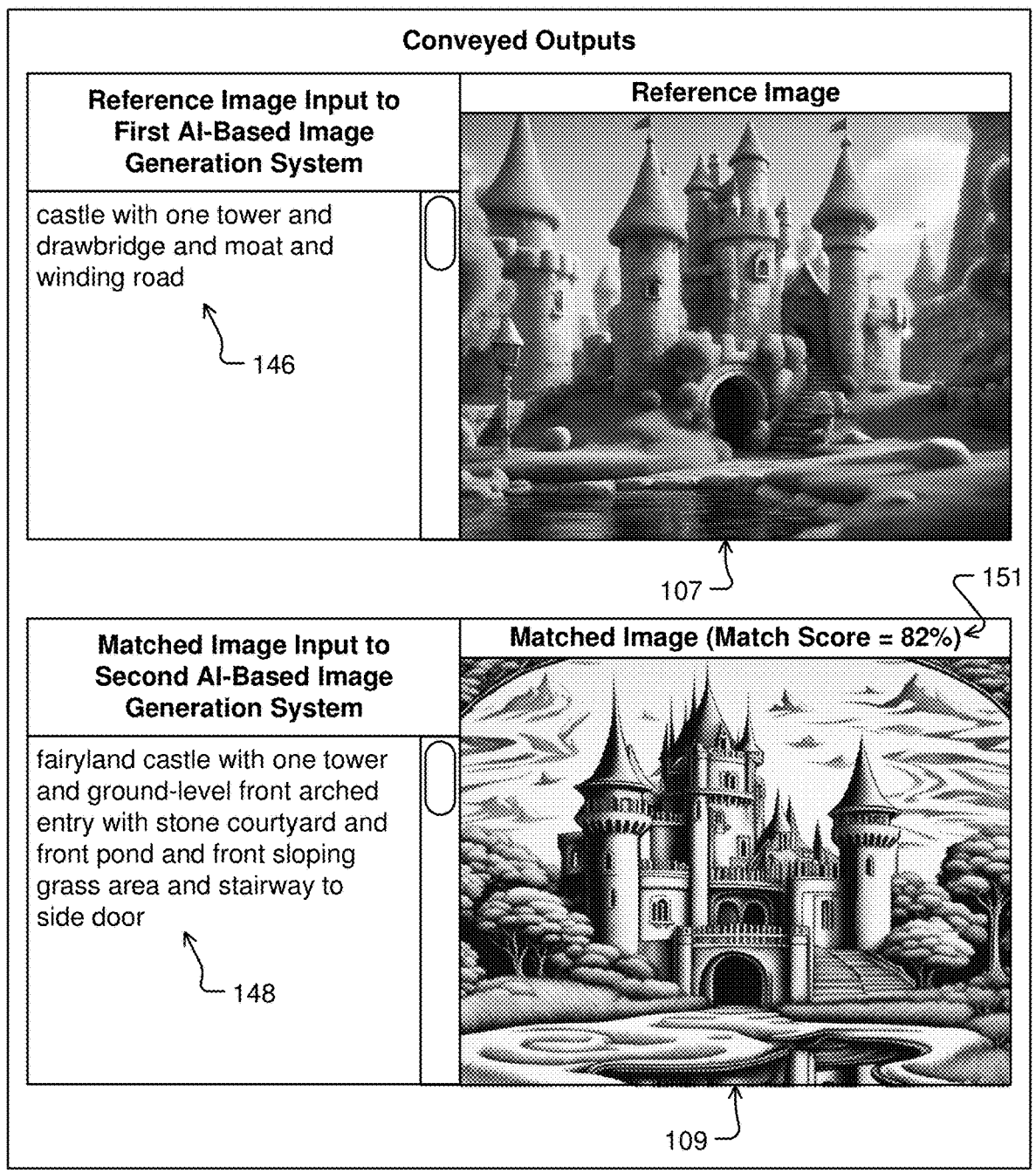
FIG. 3I shows the outputs as formatted and conveyed by the output processor for the example operation of the system as shown in FIGS. 3A-3H, in accordance with some embodiments.

FIG. 3I shows the outputs as formatted and conveyed by the output processor 119 for the example operation of the system 100 as shown in FIGS. 3A-3H, in accordance with some embodiments. The outputs include the current/final version of the reference input specification 146 and the corresponding current/final version of the reference image 107. The outputs also include the current/final version of the trial input specification 148 and the corresponding current/final version of the trial image 109, and the corresponding current/final image match score 151. In some embodiments, the user of the system 100 is able to direct the output processor 119 to output the current version of the reference input specification 146, the current version of the reference image 107, the current version of the trial input specification 148, the current version of the trial image 109, and the current image match score 151, for each trial image 109 generation and assessment iteration that is performed. In some embodiments, the user of the system 100 is able to direct the output processor 119 to output the current version of the reference input specification 146, the current version of the reference image 107, the current version of the trial input specification 148, the current version of the trial image 109, and the current image match score 151, for selected trial image 109 generation and assessment iterations that are performed. In some embodiments, the user of the system 100 is able to direct the output processor 119 to output the current version of the reference input specification 146, the current version of the reference image 107, the current version of the trial input specification 148, the current version of the trial image 109, and the current image match score 151, for just the final trial image 109 generation and assessment iteration that is performed.

Figure 4:
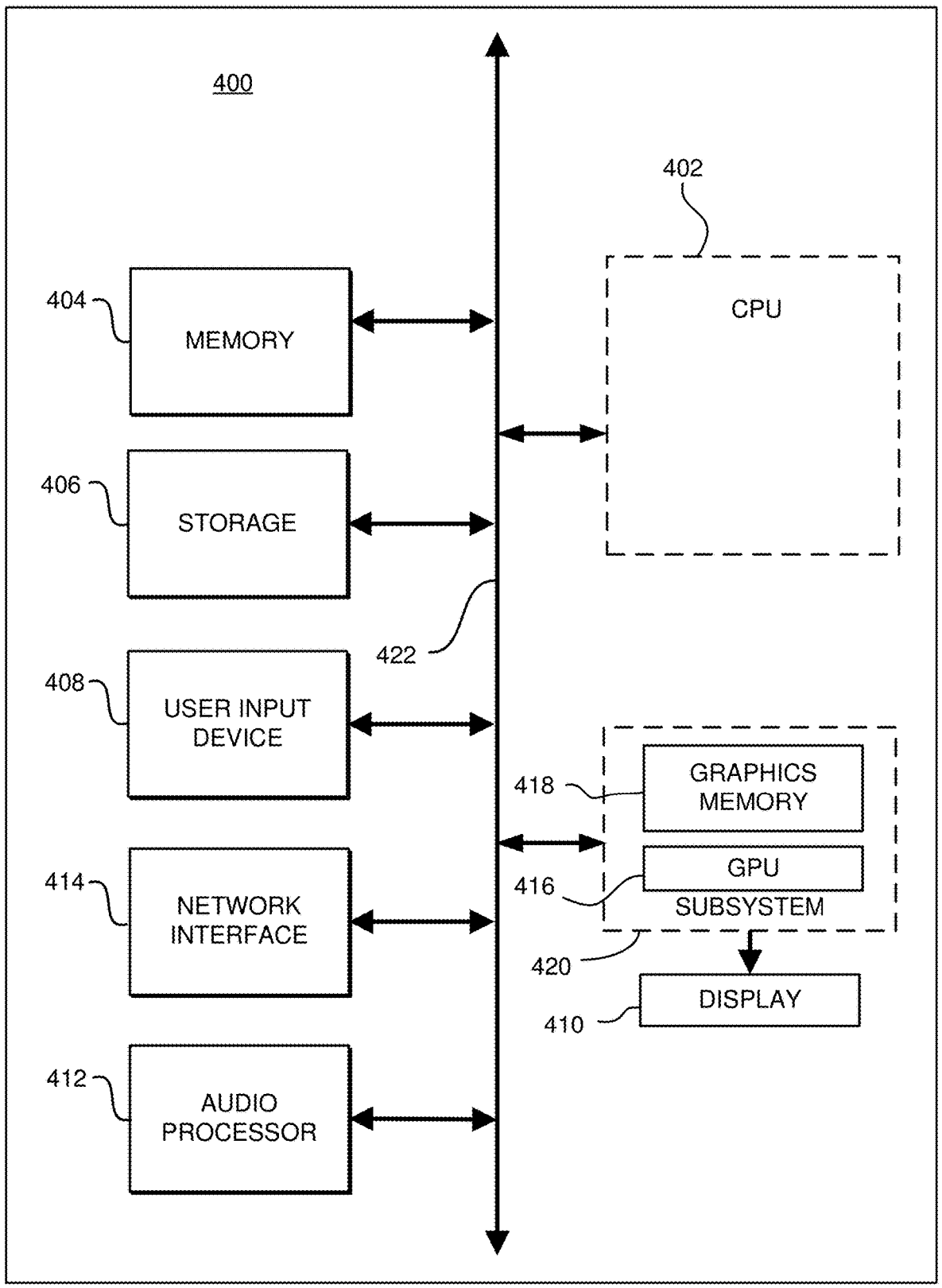
FIG. 4 shows various components of an example server device within a cloud-based computing system that can be used to perform aspects of the system and method for aligning outputs of different artificial AI-based image generation systems, in accordance with some embodiments.

FIG. 4 shows various components of an example server device 400 within a cloud-based computing system that can be used to perform aspects of the system 100 and method for aligning outputs of different artificial AI-based image generation systems, in accordance with some embodiments. This block diagram illustrates the server device 400 that can incorporate or can be a personal computer, video game console, personal digital assistant, a head mounted display (HMD), a wearable computing device, a laptop or desktop computing device, a server or any other digital computing device, suitable for practicing an embodiment of the disclosure. The server device (or simply referred to as "server" or "device") 400 includes a central processing unit (CPU) 402 for running software applications and optionally an operating system. The CPU 402 may be comprised of one or more homogeneous or heterogeneous processing cores. For example, the CPU 402 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 400 may be localized to a designer designing a game segment or remote from the designer (e.g., back-end server processor), or one of many servers using virtualization in the cloud-based gaming system 400 for remote use by designers.

Memory 404 stores applications and data for use by the CPU 402. Storage 406 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 408 communicate user inputs from one or more users to device 400, examples of which may include keyboards, mice, joysticks, touch pads, touch screens, still or video recorders/cameras, tracking devices for recognizing gestures, and/or microphones. Network interface 414 allows device 400 to communicate with other computer systems via an electronic communications network, and may include wired or wireless communication over local area networks and wide area networks such as the internet. An audio processor 412 is adapted to generate analog or digital audio output from instructions and/or data provided by the CPU 402, memory 404, and/or storage 406. The components of device 400, including CPU 402, memory 404, data storage 406, user input devices 408, network interface 414, and audio processor 412 are connected via one or more data buses 422.

A graphics subsystem 420 is further connected with data bus 422 and the components of the device 400. The graphics subsystem 420 includes a graphics processing unit (GPU) 416 and graphics memory 418. Graphics memory 418 includes a display memory (e.g., a frame buffer) used for storing pixel data for each pixel of an output image. Graphics memory 418 can be integrated in the same device as GPU 416, connected as a separate device with GPU 416, and/or implemented within memory 404. Pixel data can be provided to graphics memory 418 directly from the CPU 402. Alternatively, CPU 402 provides the GPU 416 with data and/or instructions defining the desired output images, from which the GPU 416 generates the pixel data of one or more output images. The data and/or instructions defining the desired output images can be stored in memory 404 and/or graphics memory 418. In an embodiment, the GPU 416 includes 3D rendering capabilities for generating pixel data for output images from instructions and data defining the geometry, lighting, shading, texturing, motion, and/or camera parameters for virtual object(s) within a scene. The GPU 416 can further include one or more programmable execution units capable of executing shader programs.

The graphics subsystem 420 periodically outputs pixel data for an image from graphics memory 418 to be displayed on display device 410. Display device 410 can be any device capable of displaying visual information in response to a signal from the device 400, including CRT, LCD, plasma, and OLED displays. In addition to display device 410, the pixel data can be projected onto a projection surface. Device 400 can provide the display device 410 with an analog or digital signal, for example.

Implementations of the present disclosure for the systems and methods for aligning outputs of different artificial AI-based image generation systems may be practiced using various computer device configurations including hand-held devices, microprocessor systems, microprocessor-based or programmable consumer electronics, minicomputers, mainframe computers, head-mounted display, wearable computing devices and the like. Embodiments of the present disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although various method operations were described in a particular order, it should be understood that other housekeeping operations may be performed in between the method operations. Also, method operations may be adjusted so that they occur at slightly different times or in parallel with each other. Also, method operations may be distributed in a system which allows the occurrence of the processing operations at various intervals associated with the processing.

One or more embodiments can also be fabricated as computer readable code (program instructions) on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices, or any other type of device that is capable of storing digital data. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

What is claimed is:

1. A system for aligning outputs of different artificial intelligence (AI)-based image generation systems, comprising:
   an input processor configured to receive an initial input for AI-based image generation, the input processor configured to receive a specification of a minimum required image match score;
   a first AI-based image generation system configured to generate a reference image based on a reference input specification, wherein the reference input specification is initially set equal to the initial input for AI-based image generation;
   a second AI-based image generation system configured to generate a trial image based on a trial input specification, the second AI-based image generation system being different than the first AI-based image generation system, wherein the trial input specification is initially set equal to the initial input for AI-based image generation;
   an image matching assessment system configured to process the trial image and the reference image through an image analysis AI model to determine an amount of similarity between the trial image and the reference image, the image matching assessment system configured to generate an image match score based on the determined amount of similarity between the trial image and the reference image;
   a trial input specification adjustment engine configured to generate a revised version of the trial input specification for use in generation of a new version of the trial image by the second AI-based image generation system that provides for an increase of the image match score;
   a controller configured to direct iterative operation of the second AI-based image generation system, the image matching assessment system, and the trial input specification adjustment engine until the image match score is equal to or greater than the minimum required image match score; and
   an output processor configured to format and convey as output each of the reference input specification, the reference image, the trial input specification, the trial image, and the image match score when the image match score is equal to or greater than the minimum required image match score.

2. The system as recited in claim 1, wherein the first AI-based image generation system includes one or more image generation AI models configured to generate a first genre of graphical image, and wherein the second AI-based image generation system includes one or more image generation AI models configured to generate a second genre of graphical image, the second genre different from the first genre.

3. The system as recited in claim 1, wherein each of the initial input for AI-based image generation, the reference input specification, and the trial input specification is a respective linguistic description of an image.

4. The system as recited in claim 1, wherein the image matching assessment system is configured to automatically identify a given distinguishing feature within a given image by determining an outline of the given distinguishing feature within the given image.

5. The system as recited in claim 4, wherein the image analysis AI model is configured to implement a pixel-level analysis of the given image to automatically identify pixels associated with the outline of the given distinguishing feature within the given image.

6. The system as recited in claim 1, wherein the image analysis AI model is configured to analyze the reference image to identify and characterize a first set of one or more distinguishing features within the reference image, and wherein the image analysis AI model is also configured to analyze the trial image to identify and characterize a second set of one or more distinguishing features within the trial image.

7. The system as recited in claim 6, wherein the image analysis AI model is configured to classify and label identified candidate features within the reference image, the image matching assessment system configured to filter the classified and labeled candidate features within the reference image in accordance with a number of filter parameters to determine the first set of one or more distinguishing features within the reference image, and wherein the image analysis AI model is configured to classify and label identified candidate features within the trial image, the image matching assessment system configured to filter the classified and labeled candidate features within the trial image in accordance with the number of filter parameters to determine the second set of one or more distinguishing features within the trial image.

8. The system as recited in claim 7, wherein the number of filter parameters includes a minimum size for a given distinguishing feature within a given image specified as one or more of a percentage of a total size of the given image occupied by the given distinguishing feature and a total number of pixels used to display the given distinguishing feature within the given image.

9. The system as recited in claim 1, wherein the image matching assessment system is configured to generate the image match score by evaluating a number of comparison parameters for correlated distinguishing features in the reference image and the trial image, the number of comparison parameters including one or more of a feature size, a feature shape, a feature contextual position, a feature spatial orientation, a feature texture, a feature color, a feature-to-feature relationship, a pixel intensity gradient, a pixel color, and a pixel-level color gradient.

10. The system as recited in claim 1, further comprising:
a reference input specification adjustment engine configured to generate a revised version of the reference input specification for use in generation of a new version of the reference image by the first AI-based image generation system, wherein the controller is configured to increment a trial iteration counter for each time the second AI-based image generation system generates the new version of the trial image based on the revised version of the trial input specification as generated by the trial input specification adjustment engine, the controller further configured to direct the reference input specification adjustment engine to generate the revised version of the reference input specification and to direct the first AI-based image generation system to generate the new version of the reference image when the trial iteration counter exceeds a maximum iteration value.

11. A method for aligning outputs of different artificial intelligence (AI)-based image generation systems, comprising:
a) receiving an initial input for AI-based image generation;
b) receiving a specification of a minimum required image match score;
c) operating a first AI-based image generation system to generate a reference image based on a reference input specification, wherein the reference input specification is initially set equal to the initial input for AI-based image generation;
d) operating a second AI-based image generation system to generate a trial image based on a trial input specification, the second AI-based image generation system being different than the first AI-based image generation system, wherein the trial input specification is initially set equal to the initial input for AI-based image generation;
e) processing the trial image and the reference image through an image analysis AI model to determine an amount of similarity between the trial image and the reference image;
f) generating an image match score for the trial image based on the amount of similarity between the trial image and the reference image as determined in operation e);
g) if the image match score is less than the minimum required image match score, then operating a trial input specification adjustment engine to generate a revised version of the trial input specification for use in generation of a new version of the trial image by the second AI-based image generation system that provides for an increase of the image match score, followed by sequentially repeating operations d), e), f), and g), and if the image match score is greater than or equal to the minimum required image match score, then proceeding with operation h); and
h) formatting and conveying as output each of the reference input specification, the reference image, the trial input specification, the trial image, and the image match score.

12. The method as recited in claim 11, wherein operating the first AI-based image generation system includes executing one or more image generation AI models to generate a first genre of graphical image, and wherein operating the second AI-based image generation system includes executing one or more image generation AI models to generate a second genre of graphical image, the second genre different from the first genre.

13. The method as recited in claim 11, wherein each of the initial input for AI-based image generation, the reference input specification, and the trial input specification is a respective linguistic description of an image.

14. The method as recited in claim 11, wherein the image analysis AI model automatically identifies a given distinguishing feature within a given image by determining an outline of the given distinguishing feature within the given image.

15. The method as recited in claim 14, wherein the image analysis AI model automatically identifies pixels associated with the outline of the given distinguishing feature within the given image.

16. The method as recited in claim 11, wherein the image analysis AI model automatically identifies and characterizes a first set of one or more distinguishing features within the reference image, and wherein the image analysis AI model automatically identifies and characterizes a second set of one or more distinguishing features within the trial image.

17. The method as recited in claim 16, wherein the image analysis AI model automatically classifies and labels identified candidate features within the reference image, wherein the method further comprises filtering of the classified and labeled candidate features within the reference image in accordance with a number of filter parameters to determine the first set of one or more distinguishing features within the reference image, and wherein the image analysis AI model automatically classifies and labels identified candidate features within the trial image, wherein the method further comprises filtering of the classified and labeled candidate features within the trial image in accordance with the number of filter parameters to determine the second set of one or more distinguishing features within the trial image.

18. The method as recited in claim 17, wherein the number of filter parameters includes a minimum size for a given distinguishing feature within a given image, the minimum size specified as one or more of a percentage of a total size of the given image occupied by the given distinguishing feature and a total number of pixels used to display the given distinguishing feature within the given image.

19. The method as recited in claim 11, wherein generating the image match score includes evaluating a number of comparison parameters for correlated distinguishing features in the reference image and the trial image, the number of comparison parameters including one or more of a feature size, a feature shape, a feature contextual position, a feature spatial orientation, a feature texture, a feature color, a feature-to-feature relationship, a pixel intensity gradient, a pixel color, and a pixel-level color gradient.

20. The method as recited in claim 11, wherein operation g) further includes incrementing a trial iteration counter each time the second AI-based image generation system generates the new version of the trial image based on the revised version of the trial input specification as generated by the trial input specification adjustment engine, and wherein operation g) further includes operating a reference input specification adjustment engine to generate a revised version of the reference input specification when the trial iteration counter is equal to a maximum iteration value, followed by sequentially repeating operations c), d), e), f), and g).

* * * * *